(12) United States Patent
Bacchus et al.

(10) Patent No.: US 12,372,685 B2
(45) Date of Patent: Jul. 29, 2025

(54) SYSTEM AND METHOD FOR ESTIMATING CLOUD COVER FROM A MOVING VEHICLE

(71) Applicant: GM Global Technology Operations LLC, Detroit, MI (US)

(72) Inventors: Brent Navin Roger Bacchus, Sterling Heights, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 444 days.

(21) Appl. No.: 17/929,146

(22) Filed: Sep. 1, 2022

(65) Prior Publication Data

US 2024/0077644 A1   Mar. 7, 2024

(51) Int. Cl.
*G01W 1/06*   (2006.01)
*G01S 19/14*   (2010.01)
*G01W 1/12*   (2006.01)
*H04Q 9/00*   (2006.01)

(52) U.S. Cl.
CPC .............. *G01W 1/06* (2013.01); *G01S 19/14* (2013.01); *G01W 1/12* (2013.01); *H04Q 9/00* (2013.01); *H04Q 2209/10* (2013.01); *H04Q 2209/40* (2013.01)

(58) Field of Classification Search
CPC ........ G01S 19/14; G01S 5/0244; G01W 1/06; G01W 1/12; H04Q 2209/10; H04Q 2209/40; H04Q 9/00
USPC .......................................................... 702/3
See application file for complete search history.

(56) References Cited

U.S. PATENT DOCUMENTS

| 2015/0198738 | A1* | 7/2015 | Gupta | G01W 1/06 702/3 |
| 2018/0164119 | A1* | 6/2018 | Becker | B60W 60/001 |
| 2019/0158011 | A1* | 5/2019 | West | H02S 10/00 |
| 2021/0190991 | A1* | 6/2021 | Frank | G01W 1/12 |

(Continued)

OTHER PUBLICATIONS

Stull, Roland. "ATSC 113 Weather for Sailing, Flying & Snow Sports." UBC ATSC 113—LCL Computation, Aug. 2018, www.eoas.ubc.ca/courses/atsc113/flying/met_concepts/01-met_concepts/01d-ceilings/zlcl.html#:~:text=The%20height%20at%20which%20a,2%2C460.63%20ft%20above%20ground%20level. (Year: 2018).*

(Continued)

*Primary Examiner* — Lisa M Caputo
*Assistant Examiner* — Joshua L Forristall
(74) *Attorney, Agent, or Firm* — Vivacqua Crane, PLLC

(57) ABSTRACT

A system for estimating cloud cover from moving vehicles includes: vehicle mounted sensors communicating with one or more control modules. The control modules have processors, memory, and input/output (I/O) ports. The I/O ports of the control modules of the vehicles communicate with the sensors. The control modules execute program code stored in the memory including first and second algorithm portions. The first algorithm portion, collects sensor data from the sensors, estimates atmospheric parameters from the sensor data; and computes measurement coordinates from the sensor data and atmospheric parameters. The second algorithm portion generates and selectively updates a cloud map based on from data received from the first algorithm portion, and from high-definition map (HD Map) data.

18 Claims, 3 Drawing Sheets

(56) References Cited

U.S. PATENT DOCUMENTS

2022/0327719 A1* 10/2022 Shaag ................ G01C 21/1652
2024/0426630 A1* 12/2024 Bonnet .............. G01C 21/3694

OTHER PUBLICATIONS

Riordan, D., et al. "Cloud base temperature measurements using a simple longwave infrared cloud detection system." Journal of Geophysical Research: Atmospheres, vol. 110, No. D3, Feb. 11, 2005, https://doi.org/10.1029/2004jd005390. (Year: 2005).*
Urone, Paul P, & Hinrichs, R. P. (2012). 14.7 Radiation. In College Physics. OpenStax. https://openstax.org/books/college-physics/pages/14-7-radiation (Year: 2012).*
Pandey, "Effects of Atmosphere Emissivity on Clear Sky Temperatures," Atmospheric Environment, 1995, pp. 2201-2204, vol. 29, Issue 16.
Romps, "Exact Expression for the Lifting Condensation Level," Journal of the Atmosphere Sciences, 2017, pp. 3891-3900, vol. 74, Issue12.

* cited by examiner

SYSTEM AND METHOD FOR ESTIMATING CLOUD COVER FROM A MOVING VEHICLE

INTRODUCTION

The present disclosure relates to vehicle sensors and communications systems, and more specifically to data collection systems and methods for vehicles. Motor vehicles are increasingly being equipped with networked systems that communicate both internally, i.e. onboard, and externally, i.e. with other vehicles or remotely-located infrastructure via a variety of wireless and/or wired communication systems. Vehicle data collection systems generate or capture data relating to a wide range of vehicle attributes, from entertainment and climate-control functions to vehicle dynamics and safety systems. Data collection systems, both onboard and remote, receive large quantities of data relating to vehicle and atmospheric condition attributes. The data collection systems may then report relevant data to databases for further analysis, or may provide feedback to the vehicle control and communications systems based on prior information. More specifically, vehicles and/or infrastructure may collect information regarding atmospheric conditions surrounding vehicles. However, the data collection by such vehicles and infrastructure is often inhibited by cost constraints and ambient lighting conditions. That is, sensing sky conditions currently requires expensive high-dynamic range camera equipment and inflicts a relatively high computational burden to achieve results.

Some data collected may be used to optimize vehicle performance and safety and generate route information. While current vehicle control and communications systems for estimating atmospheric conditions, including cloud cover, achieve their intended purpose, there is a need for a new and improved system and method estimating cloud cover from moving vehicles that allows for platform and vehicle flexibility, upgradability on both the vehicular end and the remote end of the system, and which operate on preexisting hardware as well as new hardware while maintaining or decreasing the cost of manufacture, assembly, and operation.

SUMMARY

According to an aspect of the present disclosure a system for estimating cloud cover from a moving vehicle includes one or more sensors disposed on the one or more moving vehicles and in communication one or more control modules of each of the one or more moving vehicles. Each of the one or more control modules has a processor, a memory, and input/output (I/O) ports. The I/O ports of the control modules of the one or more moving vehicles are in communication with the one or more sensors. The control modules execute program code portions stored in the memory. The program code portions include: a first algorithm portion having: a first program code portion that collects sensor data from the one or more sensors disposed on the one or more moving vehicles, a second program code portion that estimates atmospheric parameters from the sensor data; and a third program code portion that computes measurement coordinates from the first and second program code portions. The program code portions further include a second algorithm portion having: a fourth program code portion that, from data received from the first, second, and third program code portions, and from high-definition map (HD Map) data, generates and selectively updates a cloud map.

In another aspect of the present disclosure the first algorithm portion is carried out in an onboard computational subsystem. The first program code portion collects position data from a global positioning system (GPS) sensor, thermal data from an infrared (IR) thermometer, and ambient air pressure, ambient air temperature, and humidity from an air pressure sensor.

In yet another aspect of the present disclosure the third program code portion estimates a cloud base height and a cloud base temperature from the atmospheric parameters and the sensor data.

In still another aspect of the present disclosure the cloud base height is estimated from predicted lifting condensation levels, and wherein the cloud base temperature is estimated from sky emittance and ambient temperature.

In yet another aspect of the present disclosure the third program code portion further includes a program code portion that calculates a cloud cover fraction according to:

$$A_c = \frac{R - R_0}{\sigma T_c^4 (1 - \epsilon_0)}$$

where $T_c$ is a predicted cloud base temperature, R is a measured emittance of the sky, $\epsilon_0$ is a predicted clear sky emissivity, $R_0$ is a predicted clear sky emittance calculated from the ambient temperature and clear sky emissivity, and $\sigma$ is the Stefan-Boltzmann constant. The cloud cover fraction is calibrated according to $A'_c = \text{clip}(\alpha^* A_c, +\beta)$ where clip(x) limits values of x on the interval between 0.0 and 1.0, and $\alpha$ and $\beta$ are calibration parameters that satisfy numerical and modeling conditions.

In still another aspect of the present disclosure the second algorithm portion is carried out in a remotely-located back-office computational subsystem having one or more control modules. The fourth program code further includes: a program code portion that determines a quality of global positioning system (GPS) sensor data. Upon determining that the quality of the GPS sensor data is above or equal to a predetermined threshold value, the GPS sensor data used to update the cloud map, and upon determining that the quality of the GPS sensor data is below the predetermined threshold value, the GPS sensor data and data generated in the first, second, and third program code portions is discarded.

In yet another aspect of the present disclosure the fourth program code portion further includes a program code portion that determines an occlusion level of the sky. Upon determining that the occlusion level of the sky is above or equal to a predetermined threshold value, the GPS sensor data and the data generated in the first, second, and third program code portions is used to update the cloud map, and upon determining that the occlusion level of the sky is below the predetermined threshold value, the GPS sensor data and data generated in the first, second, and third program code portions is discarded.

In still another aspect of the present disclosure the fourth program code portion selectively generates an updated cloud map in the remotely-located back-office computational subsystem, and the remotely-located back-office computational subsystem continuously sends the updated cloud map to the one or more moving vehicles in the system.

In yet another aspect of the present disclosure the one or more moving vehicles receive the updated cloud map from the remotely-located back-office subsystem and selectively inform vehicle occupants of driving conditions based on the updated cloud map.

In still another aspect of the present disclosure a method for estimating cloud cover from one or more moving vehicles includes: capturing sensor data, with one or more sensors disposed on the one or more moving vehicles and in communication with one or more control modules. Each of the one or more control modules has a processor, a memory, and input/output (I/O) ports. The I/O ports of the control modules of the one or more moving vehicles are in communication with the one or more sensors. The control modules execute program code portions stored in the memory. The program code portions include a first algorithm portion. The first algorithm portion: collects sensor data from the one or more sensors disposed on the one or more moving vehicles, estimates atmospheric parameters from the sensor data; and computes measurement coordinates from the first and second program code portions. The program code portions further include a second algorithm portion, the second algorithm portion generating and selectively updating a cloud map from the sensor data, the atmospheric parameters, and the measurement coordinates, and from high-definition map (HD Map) data stored in memory of the one or more control modules.

In yet another aspect of the present disclosure the method for estimating cloud cover from one or more moving vehicles further includes executing the first algorithm portion in an onboard computational subsystem of each of the one or more moving vehicles, and executing the second algorithm portion in a remotely-located back-office computational subsystem. Each of the onboard and back-office computational subsystems has one or more of the control modules. The method further includes collecting position data from a global positioning system (GPS) sensor; collecting thermal data from an infrared (IR) thermometer, and collecting ambient air pressure, ambient air temperature, and humidity from an air pressure sensor.

In still another aspect of the present disclosure the method further includes estimating a cloud base height and a cloud base temperature from the atmospheric parameters and the sensor data.

In yet another aspect of the present disclosure the method further includes estimating the cloud base height from predicted lifting condensation levels, and estimating the cloud base temperature from sky emittance and ambient temperature.

In still another aspect of the present disclosure the method further includes calculating a cloud cover fraction according to:

$$A_c = \frac{R - R_0}{\sigma T_c^4 (1 - \epsilon_0)}$$

where $T_c$ is a predicted cloud base temperature, R is a measured emittance of the sky, $\epsilon_0$ is a predicted clear sky emissivity, $R_0$ is a predicted clear sky emittance calculated from the ambient temperature and clear sky emissivity, and $\sigma$ is the Stefan-Boltzmann constant. The cloud cover fraction is calibrated according to $A'_c = \text{clip}(\alpha * A_c + \beta)$ where clip(x) limits values of x on the interval between 0.0 and 1.0, and $\alpha$ and $\beta$ are calibration parameters that satisfy numerical and modeling conditions.

In yet another aspect of the present disclosure the method further includes determining a quality of global positioning system (GPS) sensor data. Upon determining that the quality of the GPS sensor data is above or equal to a predetermined threshold value, the method uses the GPS sensor data and the data generated in the first algorithm portion to update the cloud map, and upon determining that the quality of the GPS sensor data is below the predetermined threshold value, the method discards the GPS sensor data and data generated in the first algorithm portion.

In still another aspect of the present disclosure the method further includes determining an occlusion level of the sky. Upon determining that the occlusion level of the sky is above or equal to a predetermined threshold value, the method updates the cloud map with the GPS sensor data and the data generated in the first algorithm portion, and upon determining that the occlusion level of the sky is below the predetermined threshold value, the method discards the GPS sensor data and data generated in first algorithm portion.

In yet another aspect of the present disclosure the method further includes selectively generating an updated cloud map in the remotely-located back-office computational subsystem, and continuously sending the updated cloud map from the remotely-located back-office computational subsystem to the one or more moving vehicles.

In still another aspect of the present disclosure the method further includes receiving, by the one or more moving vehicles, the updated cloud map from the remotely-located back-office subsystem; and selectively informing vehicle occupants of driving conditions based on the updated cloud map.

In yet another aspect of the present disclosure a system for estimating cloud cover from one or more moving vehicles includes one or more sensors disposed on the one or more moving vehicles and in communication with an onboard computational subsystem of each of the one or more moving vehicles. The system further includes a remotely-located back-office computational subsystem. Each of the onboard computational subsystems and the remotely-located back-office computational subsystem include: one or more control modules. Each of the one or more control modules has a processor, a memory, and input/output (I/O) ports. The I/O ports of the control modules of the one or more moving vehicles are in communication with the one or more sensors and with the remotely-located back-office computational subsystem control modules. The control modules execute program code portions stored in the memory. The program code portions include a first algorithm portion having: a first program code portion that collects sensor data from the one or more sensors disposed on the moving vehicles. The sensor data includes position data from a global positioning system (GPS) sensor, thermal data from an infrared (IR) thermometer, and ambient air pressure, ambient air temperature, and humidity data from an air pressure sensor. A second program code portion estimates atmospheric parameters from the sensor data. A third program code portion computes measurement coordinates from the first and second program code portions. The measurement coordinates include an estimated a cloud base height and an estimated cloud base temperature wherein the cloud base height is estimated from predicted lifting condensation levels. The cloud base temperature is estimated from sky emittance and ambient temperature. The third program portion also calculates a cloud cover fraction according to:

$$A_c = \frac{R - R_0}{\sigma T_c^4 (1 - \epsilon_0)}$$

where $T_c$ is a predicted cloud base temperature, R is a measured emittance of the sky, $\epsilon_0$ is a predicted clear sky emissivity, $R_0$ is a predicted clear sky emittance calculated from the ambient temperature and clear sky emissivity, and σ is the Stefan-Boltzmann constant. The cloud cover fraction is calibrated according to $A'_c = \text{clip}(\alpha * A_c + \beta)$ where clip(x) limits values of x on the interval between 0.0 and 1.0, and α and β are calibration parameters that satisfy numerical and modeling conditions. The program code portions further include a second algorithm portion having: a fourth program code portion that, from data received from the first, second, and third program code portions, and from high-definition map (HD Map) data, generates and selectively updates a cloud map. The fourth program code portion determines a quality of global positioning system (GPS) sensor data. Upon determining that the quality of the GPS sensor data is above or equal to a predetermined threshold value, the GPS sensor data and data generated in the first, second, and third program code portions is used to update the cloud map, and upon determining that the quality of the GPS sensor data is below the predetermined threshold value, the GPS sensor data and data generated in the first, second, and third program code portions is discarded. The fourth program code portion determines an occlusion level of the sky. Upon determining that the occlusion level of the sky is above or equal to a predetermined threshold value, the GPS sensor data and the data generated in the first, second, and third program code portions is used to update the cloud map. Upon determining that the occlusion level of the sky is below the predetermined threshold value, the GPS sensor data and data generated in the first, second, and third program code portions is discarded. The first algorithm portion is carried out in the onboard computational subsystems and the second algorithm portion is carried out in the remotely-located back-office computational subsystem.

In still another aspect of the present disclosure the fourth program code portion selectively generates an updated cloud map in the remotely-located back-office computational subsystem and the remotely-located back-office computational subsystem continuously sends the updated cloud map to the one or more moving vehicles in the system. The one or more moving vehicles receive the updated cloud map from the remotely-located back-office subsystem and selectively inform vehicle occupants of driving conditions based on the updated cloud map.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In the claims and specification, certain elements are designated as "first", "second", "third", "fourth", "fifth", "sixth", and "seventh", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

Figure 1:
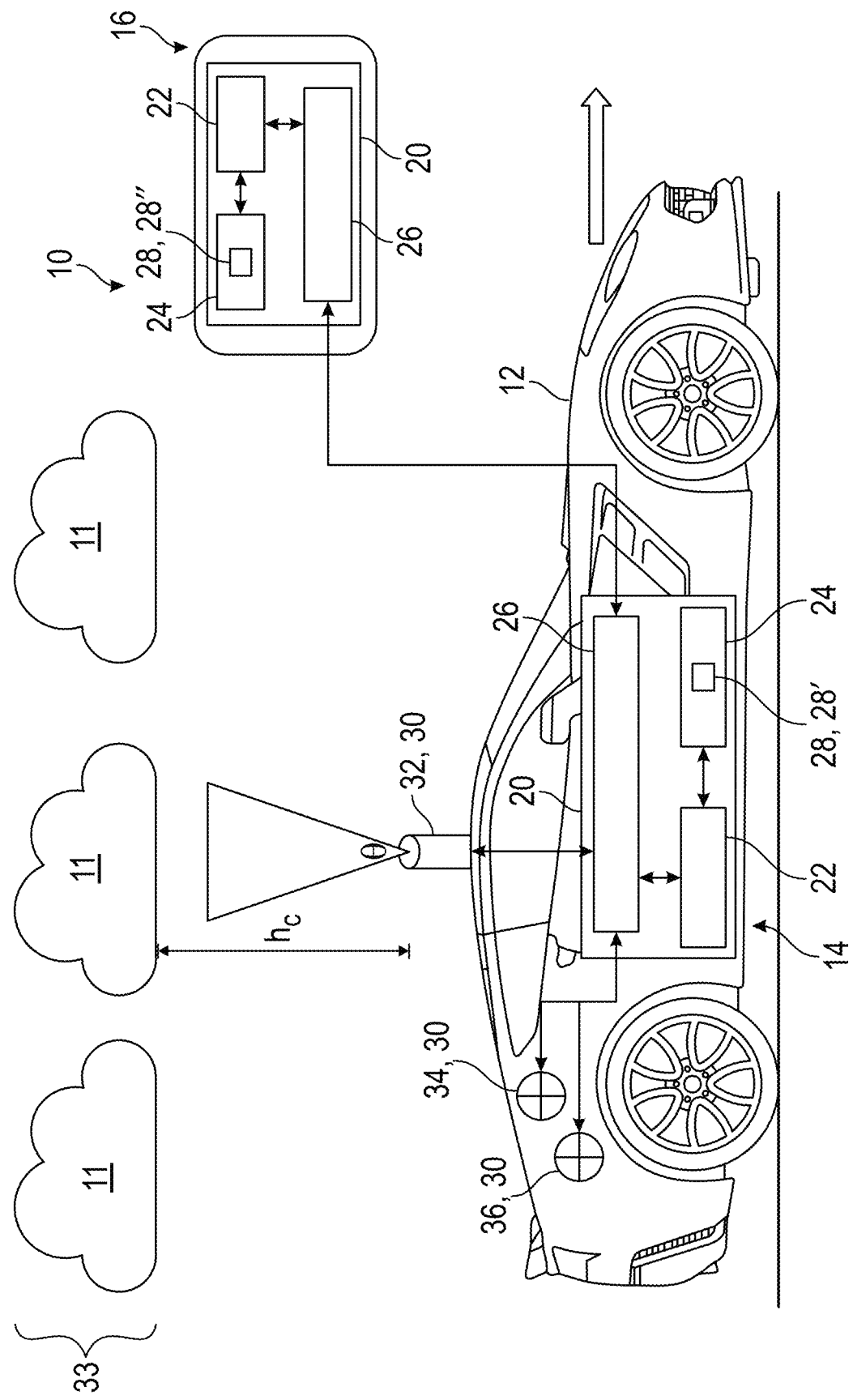
FIG. 1 is a schematic diagram of a system for estimating cloud cover from a moving vehicle according to an aspect of the present disclosure.
Figure 2:
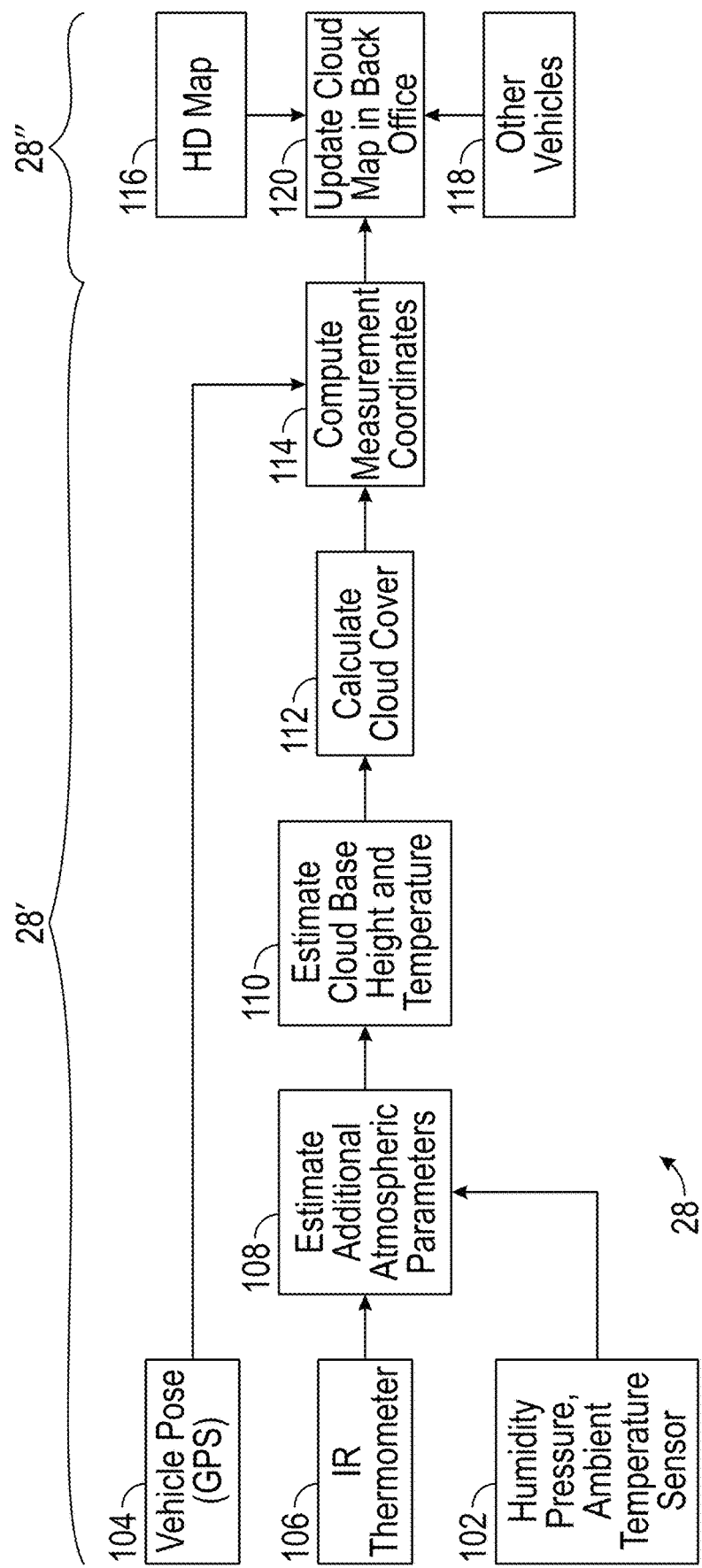
FIG. 2 is a functional block diagram of an algorithm for estimating cloud cover from a moving vehicle depicted in FIG. 1 according to an aspect of the present disclosure.

Referring now to FIGS. 1 and 2, a system 10 estimating cloud 11 cover from a moving vehicle 12 is shown. The system 10 operates on onboard vehicle 14 and remotely-located back-office computational subsystems 16. More specifically, the system 10 operates end-to-end and provides a fine-granularity, elastic coordination between the onboard vehicle computational subsystem 14 and the back-office computational subsystem 16 based on available resources with varying levels of sophistication.

The onboard vehicle computational subsystem 14 and the back-office computational subsystem 16 are each composed of one or more control modules 20. The control modules 20 are non-generalized, electronic control devices having a preprogrammed digital computer or processor 22, non-transitory computer readable medium or memory 24 used to store data such as control logic, software applications, instructions, computer code, data, lookup tables, etc., and a transceiver or input/output (I/O) ports 26. Memory 24 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 24 excludes wired, wireless, optical, or other communication links that transport transitory electrical or other signals. A non-transitory computer memory 24 includes media where data may be permanently stored and media where data can be stored and later overwritten, such as a rewritable optical disc or an erasable memory device. Computer code includes any type of program code, including source code, object code, and executable code. The processor 22 is configured to execute the code or instructions. The control modules 20 may also be dedicated Wi-Fi controllers, engine control modules, transmission control modules, body control modules, infotainment control modules, or the like. The I/O ports 26 are configured to communicate wirelessly or through wired means with known means, including Wi-Fi protocols under IEEE 802.11x.

The control modules 20 may further include one or more applications 28. An application 28 is a software program configured to perform a specific function or set of functions. The application 28 may include one or more computer programs, algorithms, software components, sets of instructions, procedures, functions, objects, classes, instances, related data, or a portion thereof adapted for implementation in a suitable computer readable program code. The applications 28 may be stored within the memory 24 or in additional or separate memory 24.

Turning now specifically to FIG. 2, and with continuing reference to FIG. 1, on several aspects, one or more of the applications 28 defines an algorithm for determining cloud 11 cover above moving vehicles 12 equipped with one or more sensors 30. The sensors 30 may infrared (IR) thermometers 32, ambient air temperature, humidity, and air pressure sensors 34, cameras, global positioning system (GPS) sensors 36, or the like. In some aspects, the algorithm for determining cloud 11 cover above moving vehicles 12 is carried out in at least two portions. A first portion 28' is carried out onboard the motor vehicles 12 in the onboard vehicle computational subsystem 14, while a second portion 28" is carried out within the back-office computational subsystem 16.

Within the first portion 28', at block 102, the sensors 30 take real-time and/or periodic measurements of humidity, pressure, and ambient temperature of the environment surrounding the vehicle 12. At block 104 the geographic and/or topological position of the vehicle 12 is obtained from a GPS sensor 36. In addition, at block 106 an IR thermometer 32 affixed to the vehicle 12, pointing skyward, and having a known field of view θ, retrieves thermal information about the sky 33 above the vehicle 12. In several aspects, the field of view θ is a characteristic of the specific IR thermometer 32 hardware. Accordingly, it should be appreciated that the field of view θ of a given IR thermometer 32 may vary from device to device. In some examples, the field of view θ may be characterized by the optical aperture of the IR thermometer 32 as indicated by an angular measure such as angle θ shown in the drawings.

At block 108, based on the data from the IR thermometer 32 and the ambient air temperature, humidity, and air pressure sensors 34, parameters such as vapor pressure, atmospheric emissivity, and the like may be estimated using known models such as those described in "Exact expression for the lifting condensation level." *Journal of the Atmospheric Sciences* 74.12 (2017): 3891-3900 by David M. Romps and "Effects of atmospheric emissivity on clear sky 33 temperatures." *Atmospheric Environment* 29.16 (1995); 2201-2204 by Dhirendra K. Pandey, Robert. B. Lee III, and Jack Paden. However, it should be appreciated that additional or different models may be used to perform the estimations and predictions described above without departing from the scope or intent of the present disclosure.

The real-time and/or periodic measurements from blocks 102, 104, 106, and the estimations performed at block 108 are used to determine a cloud 11 base height $h_c$ and cloud 11 temperature within range of the various sensors 30 at block 110. At block 112, the system 10 determines a coverage of the IR thermometer 32 using predicted cloud 11 height, sensor parameters, and the GPS coordinates of the vehicle 12.

A sky 33 emittance model is also used to predict cloud 11 cover based on data from the sensors 30 equipped to the vehicle 12. More specifically, the system 10 approximates the cloud 11 base height $h_c$ using predicted lifting condensation levels. The cloud 11 cover fraction $A_c$ is computed from radiation balance equations and sky 33 emissivity models using:

$$A_c = \frac{R - R_0}{\sigma T_C^4 (1 - \epsilon_0)}$$

where $T_c$ is predicted cloud 11 base temperature, R is measured emittance of the sky 33 which is calculated from ambient temperature using the Stefan-Boltzmann law, $\epsilon_0$ is the predicted clear sky 33 emissivity, $R_0$ is the predicted clear sky 33 emittance, calculated from the ambient temperature and clear sky 33 emissivity, and $\sigma$ is the Stefan-Boltzmann constant. In some aspects, the cloud 11 cover fraction $A_c$ is simplified or clipped to $A'_c = \text{clip}(\alpha^* A_c + \beta)$ where clip(x) limits values of x on the interval between 0.0 and 1.0, and $\alpha$ and $\beta$ are calibration parameters that satisfy numerical and modeling conditions. At block 114, the field of view θ, cloud 11 height $h_c$ and other atmospheric parameters determined by the IR thermometer 32 and the other sensors 30 on the vehicle 12 are combined with the vehicle 12 position information from the GPS sensor 36 to determine measurement coordinates of a region of the sky 33 being measured.

At block 116, the system 10 accesses a High-Definition (HD) Map of the motor vehicle 12 location. HD maps are highly accurate maps containing details captured by highly precise scanning means including LiDAR, RADAR, digital cameras, GPS, aerial imagery, or the like. Such HD Maps may include, for example, elements such as road shape, road markings, traffic signs, barriers, or the like. At block 118, the back office computational subsystem 16 communicates with other vehicles 12 in the system 10, and receives first portion 28' outputs from each of the other motor vehicles 12 of the system 10. At block 120, the back office computational subsystem 16 updates a cloud 11 map in the utilizing the data from each of the vehicles 12 in the system 10, the outputs from the first portion 28' of the algorithm, and other data sources, such as the HD map.

The cloud 11 map may be used in a variety of manners. In several examples, the system 10 may produce a cloud 11 map that can document environmental and visibility conditions. The environmental and visibility condition information may be used to supplement insurance reports or police reports or the like after a traffic crash, notify vehicle occupants, including drivers, passengers, and the like of suggested driving behavior adaptations, and so forth. Similarly, the environmental and visibility condition information may be utilized in a system 10 learning and update procedure to correlate automated vehicle performance to environmental conditions. In further examples, the cloud 11 map may be used to predict weather precipitation events. From predicted weather precipitation events, the system 10 may estimate, along with windscreen wiper and other vehicle 12 telemetry, to characterize atmospheric precipitation within a specific geographic area. More specifically, the system 10 can use the cloud 11 map to accurately determine areas where precipitation is actually reaching the ground, as well as specific locations where the precipitation may be falling in or suspended in the air. That is, the system 10 identifies and distinguishes falling rain or the like from road spray, fog, and similar water sources. The predicted weather precipitation events may also be used as a predictive indicator to improve navigation speed, efficiency, and safety. In broader examples, the system 10 may use the predicted weather precipitation events in automated vehicle operations management, for example: to alter the locations and movements of ground fleets or initiate a pull-over event before a particular weather occurrence.

The system 10 may further use the updated HD map to qualify sensor 30 data collection. That is, the updated HD map enables collection of specific map attributes under ideal conditions. Each sensor 30 may collect data in a wide variety of operating conditions. In some examples, a camera may collect optical information in high light and low ambient light conditions. However, the acuity and quality of the images collected may vary substantially depending on the ambient light conditions. Similarly, inclement weather may obscure or impede objects from being accurately collected in the optical information obtained by the camera.

GPS sensors 36 may likewise generate position information with varying accuracy depending on the quantity of satellites that the GPS sensor 36 can contact. For example, the GPS sensors 36 may generate vehicle 12 position information with extremely high accuracy where the vehicle 12 is on open countryside without trees, tall buildings, mountains, tunnels, overpasses, or the like to impede line-of-sight communication with GPS satellites in orbit around the Earth. However, GPS sensor 36 accuracy may decrease where line-of-sight communications with GPS satellites is impaired or impossible. GPS position reports may be augmented in some examples with information from attitude sensors such as inertial measurement units (IMUs), gyroscopic position sensors, accelerometers, or the like. However, the IMUs may only provide relative position estimates based on prior vehicle 12 position information generated by the GPS sensor 36.

Accordingly, the system 10 may utilize the suite of sensors 30 equipped to the vehicle 12 to determine ambient light conditions, forward illumination readings and the like using cameras affixed to the vehicle 12. The ambient light conditions, forward illumination readings, and the like may be used to qualify the data collected by the IR thermometer 32, the air pressure sensor 34, the GPS sensor 36, and other sensors 30. The qualified data is used to determine whether and when the data collected from the various sensors 30 is of sufficiently high quality to be used to adjust or alter the HD Map information. In a specific example, aerial imagery processing may be rated in respect to calculated cloud 11 cover or used as part of an aerial image characterization system.

The cloud 11 cover information collected by and determined from the system 10 of the present disclosure may be used in a variety of applications. In some examples, the cloud 11 cover information may be used by onboard navigation systems in a vehicle 12 to determine the locations of thermally ideal autonomous vehicle 12 charging locations. These locations may be in areas with cover from trees, buildings, or the like, and having lower radiative heating than surrounding areas, while having a higher sky 33 temperature reading. These locations may be used as suggested charging locations for electric vehicles.

Figure 3:
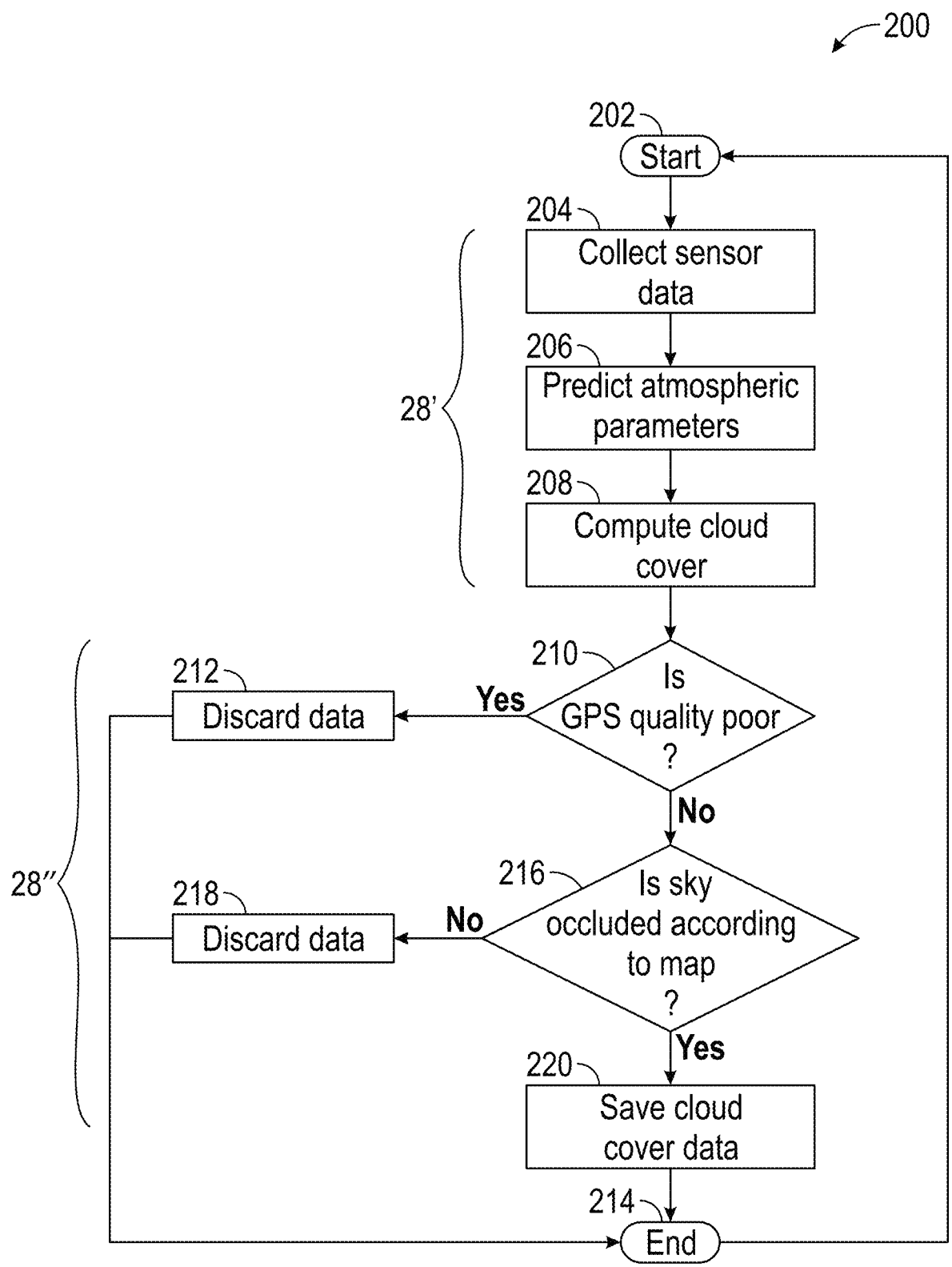
FIG. 3 is a block diagram depicting a method for estimating cloud cover from a moving vehicle according to an aspect of the present disclosure.

Turning now to FIG. 3 and with continuing reference to FIGS. 1 and 2, a method 200 for estimating cloud 11 cover from a moving vehicle 12 is shown. The method 200 begins at block 202. At block 204 the system 10 engages the first portion 28' of the algorithm for determining cloud 11 cover from a moving vehicle 12. The first portion 28', as described hereinabove, is carried out within the onboard computational subsystem 14. More specifically, at block 204, the method collects sensor data from the suite of sensors 30, and particularly from the IR thermometer 32 affixed to the vehicle 12. At block 206, the method 200 predicts a variety of atmospheric parameters based on sensor data from the IR thermometer 32, from the ambient air temperature, humidity, and air pressure sensors 34. Parameters such as vapor pressure, atmospheric emissivity, and the like are estimated.

At block 208 utilizing the predicted atmospheric parameters from block 206, the method 200 computes the cloud 11 cover fraction $A_c$. At block 210, the method 200 determines a quality of the GPS sensor 36 data. When the quality of the GPS sensor 36 data is below a threshold value, the method 200 proceeds to block 212 where the GPS sensor 36 data and the data from the IR thermometer 32, from the ambient air temperature, humidity, and air pressure sensors 34 is discarded and the method proceeds to and ends at block 214. However, when the quality of the IR thermometer data 32, the ambient air temperature, humidity, and air pressure sensor 34 data, and the GPS sensor 36 data is greater than or equal to the threshold value, the method 200 proceeds to block 216.

At block 216, the method 200 determines whether the sky 33 is occluded according to previously collected HD map information. When the occlusion level of the sky 33 is below a threshold value, the method 200 proceeds to block 218 where the GPS sensor 36 data and the data from the IR thermometer 32, from the ambient air temperature, humidity, and air pressure sensors 34 is discarded. The method 200 subsequently proceeds to and ends at block 214. However, when the occlusion level of the sky 33 is equal to or above the threshold value, the method 200 proceeds to block 220 where the cloud 11 cover data from the HD Map, the GPS sensor 36, the other onboard vehicle 12 sensors 30 is saved as an update to the HD Map. The cloud 11 cover data updates to the HD Map may further be refined by the collection and fusion of data from a large quantity of vehicles 12. Additionally, a decay function, factor, or multiplier may be applied to the data from each of the vehicles 12 in the system 10 and to the HD Map itself. The decay function, factor, or multiplier decreases confidence in the data in the absence of new or updated sensor 30 readings. Accordingly, the older a piece of sensor 30 data, the less impactful or important it will be to the final HD Map. Data interpolation methods may also be used to fill in gaps where missing sensor 30 data should be. For example, if a vehicle 12 is inside a tunnel or otherwise obscured from GPS satellites, the position data for that vehicle 12 may be interpolated to provide a predicted new location at a subsequent point in time while the vehicle 12 is still obscured. The predicted new location information may be supplemented with HD map information and cloud 11 cover information provided by other vehicles 12 in a similar area and/or by sensors 30 disposed on infrastructure surrounding the tunnel, or the like.

From block 220, the method 200 then proceeds to block 214 where the method 200 ends. From block 214, the method returns to block 202 where the method 200 starts again. It should be appreciated that the method 200 may run continuously, periodically, recursively, or the like depending on available computational and communications resources without departing from the scope or intent of the present disclosure.

A system and method for cloud 11 coordinated vehicle data collection according to the present disclosure offers several advantages. These include the ability to use low-cost hardware operating in real-time with one or more IR thermometers 32 to determine the spatial distribution of clouds with information collected from multiple vehicles 12, improving weather forecasts, and improving cloud 11 cover prediction accuracy agnostic of ambient lighting conditions. The system and method of the present disclosure also improve advanced driver assistance system (ADAS) functions by increasing safety, decreasing computational, electrical, and other fuel resource consumption, improving vehicle 12 occupant comfort, improving EV and PHEV charging activities, and providing environmental and visibility condition information that may be used to supplement insurance reports or police reports or the like after a traffic crash, notify vehicle occupants, including drivers, passengers, and the like of suggested driving behavior adaptations without increasing manufacturing, hardware, or other such costs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for estimating cloud cover from one or more moving vehicles, the system comprising:
   one or more sensors disposed on the one or more moving vehicles and in communication with one or more control modules of each of the one or more moving vehicles;
   each of the one or more control modules having a processor, a non-transitory memory, and input/output (I/O) ports, the I/O ports of the control modules of the one or more moving vehicles in communication with the one or more sensors; the one or more control modules executing program code portions stored in the non-transitory memory, the program code portions comprising:
   a first algorithm portion having:
      a first program code portion that collects sensor data from the one or more sensors disposed on the one or more moving vehicles;
      a second program code portion that estimates atmospheric parameters from the sensor data; and a third program code portion that computes measurement coordinates from the first and second program code portions;
   and a second algorithm portion having:
      a fourth program code portion that, from data received from the first, second, and third program code portions, and from high-definition map (HD Map) data generates and selectively updates a cloud map, wherein the fourth program code portion further comprises: a program code portion that determines that a portion of sky above the one or more moving vehicles is occluded, and upon determining that an occlusion level of the portion of sky above the one or more moving vehicles is above or equal to a predetermined threshold value, a program code portion that determines a quality of global positioning system (GPS) sensor data, the GPS sensor data and data generated in the first, second, and third program code portions is used to update the cloud map, and upon determining that the occlusion level of the portion of sky above the one or more moving vehicles is below the predetermined threshold value, the GPS sensor data and data generated in the first, second, and third program code portions is discarded,
      wherein the fourth program code portion determines that the portion of sky above the one or more moving vehicles is occluded according to previously collected HD map information and from data comprising:
         GPS sensor data; ambient light conditions, forward illumination readings from cameras affixed to the one or more moving vehicles and used to qualify data collected by an infrared (IR) thermometer; an ambient air pressure sensor; an ambient humidity sensor; and an ambient air temperature sensor; and
      wherein GPS sensor data accuracy is high in locations without trees, tall buildings, mountains, tunnels and/or overpasses and decreases where line-of-sight communications with GPS satellites is interrupted or impaired by trees, tall buildings, mountains, tunnels, and/or overpasses; and
      wherein the one or more sensors of the one or more moving vehicles collect environmental and visibility condition information comprising: ambient light condition information, high light and low light condition information, and forward illumination readings.

2. The system for estimating cloud cover from one or more moving vehicles of claim 1, wherein the first algorithm portion is carried out in an onboard computational subsystem of each of the one or more moving vehicles, the onboard computational subsystem having one or more control modules, and wherein the first program code portion collects position data from a global positioning system (GPS) sensor, thermal data from an infrared (IR) thermometer, and ambient air pressure, ambient air temperature, and humidity from an air pressure sensor.

3. The system for estimating cloud cover from one or more moving vehicles of claim 2, wherein the third program code portion estimates a cloud base height and a cloud base temperature from the atmospheric parameters and the sensor data.

4. The system for estimating cloud cover from one or more moving vehicles of claim 3, wherein the cloud base height is estimated from predicted lifting condensation levels, and wherein the cloud base temperature is estimated from sky emittance and ambient temperature.

5. The system for estimating cloud cover from one or more moving vehicles of claim 1, wherein the third program code portion further comprises, a program code portion that calculates a cloud cover fraction according to:

$$A_c = \frac{(R - R_0)}{\sigma T_c^4 (1 - \epsilon_0)}$$

where $T_c$ is a predicted cloud base temperature, R is a measured sky emittance, $\epsilon_0$ is a predicted clear sky emissivity, $R_0$ is a predicted clear sky emittance calculated from the ambient temperature and clear sky emissivity, and $\sigma$ is the Stefan-Boltzmann constant.

6. The system for estimating cloud cover from one or more moving vehicles of claim 1, wherein the fourth program code portion further comprises:
   a program code portion that determines a quality of global positioning system (GPS) sensor data and upon determining that the quality of the GPS sensor data is above or equal to a predetermined threshold value, the GPS sensor data used to update the cloud map, and upon determining that the quality of the GPS sensor data is below the predetermined threshold value, the GPS sensor data and data generated in the first, second, and third program code portions is discarded.

7. The system for estimating cloud cover from one or more moving vehicles of claim 1, wherein the second algorithm portion is carried out in a remotely-located back-office computational subsystem having one or more control modules, and wherein the fourth program code portion selectively generates an updated cloud map in the remotely-located back-office computational subsystem, and the remotely-located back-office computational subsystem continuously sends the updated cloud map to the one or more moving vehicles in the system.

8. The system for estimating cloud cover from one or more moving vehicles of claim 7, wherein the one or more moving vehicles receive the updated cloud map from the remotely-located back-office subsystem and selectively inform vehicle occupants of driving conditions based on the updated cloud map.

9. A method for estimating cloud cover from one or more moving vehicles, the method comprising:
   capturing sensor data, with one or more sensors disposed on the one or more moving vehicles and in communication with one or more control modules of the one or more moving vehicles, each of the one or more control modules having a processor, a non-transitory memory, and input/output (I/O) ports, the I/O ports of the control modules of the one or more moving vehicles in communication with the one or more sensors, the control modules executing program code portions stored in the non-transitory memory;
   executing a first algorithm portion of the one or more control modules, the first algorithm portion:
      collecting sensor data from the one or more sensors disposed on the one or more moving vehicles;
      estimating atmospheric parameters from the sensor data;
      and computing measurement coordinates from the sensor data and the atmospheric parameters;
   and executing a second algorithm portion of the one or more control modules, the second algorithm portion:
      generating and selectively updating a cloud map from the sensor data, the atmospheric parameters, and the measurement coordinates, and from high-definition map (HD Map) data stored in non-transitory memory of the one or more control modules,
      determining that a portion of sky above the one or more moving vehicles is occluded, and upon determining that an occlusion level of the portion of sky above the one or more moving vehicles is above or equal to a predetermined threshold value, a program code portion that determines a quality of global positioning system (GPS) sensor data, the GPS sensor data and data generated in the first algorithm portion is used to update the cloud map, and upon determining that the occlusion level of the portion of sky above the one or more moving vehicles is below the predetermined threshold value, the GPS sensor data and data generated in the first algorithm portion is discarded,
      wherein determining that the portion of sky above the one or more moving vehicles is occluded according to previously collected HD map information and from data comprising:
         GPS sensor data; ambient light conditions, forward illumination readings from cameras affixed to the one or more moving vehicles and used to qualify data collected by an infrared (IR) thermometer; an ambient air pressure sensor; an ambient humidity sensor; and an ambient air temperature sensor; and
         wherein GPS sensor data accuracy is high in locations without trees, tall buildings, mountains, tunnels and/or overpasses and decreases where line-of-sight communications with GPS satellites is interrupted or impaired by trees, tall buildings, mountains, tunnels, and/or overpasses; and
         collecting via the one or more sensors of the one or more moving vehicles collect environmental and visibility condition information comprising: ambient light condition information, high light and low light condition information, and forward illumination readings.

10. The method for estimating cloud cover from one or more moving vehicles of claim 9, further comprising:
    executing the first algorithm portion in an onboard computational subsystem of each of the one or more moving vehicles having one or more of the control modules; and
    executing the second algorithm portion in a remotely-located back-office computational subsystem having one or more of the control modules.

11. The method for estimating cloud cover from one or more moving vehicles of claim 10 further comprising:
    collecting position data from a global positioning system (GPS) sensor;
    collecting thermal data from an infrared (IR) thermometer;
    collecting ambient air pressure, ambient air temperature, and humidity from an air pressure sensor; and
    estimating a cloud base height and a cloud base temperature from the atmospheric parameters and the sensor data.

12. The method for estimating cloud cover from one or more moving vehicles of claim 11, further comprising:
    estimating the cloud base height from predicted lifting condensation levels; and
    estimating the cloud base temperature from sky emittance and ambient temperature.

13. The method for estimating cloud cover from one or more moving vehicles of claim 10 further comprising:
    Calculating a cloud cover fraction according to:

$$A_c = \frac{(R - R_0)}{\sigma T_c^4 (1 - \epsilon_0)}$$

where $T_c$ is a predicted cloud base temperature, R is a measured sky emittance, $\epsilon_0$ is a predicted clear sky emissivity, $R_a$ is a predicted clear sky emittance calculated from the ambient temperature and clear sky emissivity, and $\sigma$ is the Stefan-Boltzmann constant.

14. The method for estimating cloud cover from one or more moving vehicles of claim 9 further comprising:
    determining a quality of global positioning system (GPS) sensor data and upon determining that the quality of the GPS sensor data is above or equal to a predetermined threshold value, using the GPS sensor data and the data generated in the first algorithm portion to update the cloud map, and upon determining that the quality of the GPS sensor data is below the predetermined threshold value, discarding the GPS sensor data and data generated in the first algorithm portion.

15. The method for estimating cloud cover from one or more moving vehicles of claim 10 further comprising:
    selectively generating an updated cloud map in the remotely-located back-office computational subsystem; and
    continuously sending the updated cloud map from the remotely-located back-office computational subsystem to the one or more moving vehicles.

16. The method for estimating cloud cover from one or more moving vehicles of claim 15 further comprising:
    receiving, by the one or more moving vehicles, the updated cloud map from the remotely-located back-office subsystem; and
    selectively informing vehicle occupants of driving conditions based on the updated cloud map.

17. A system for estimating cloud cover from one or more moving vehicles, the system comprising:
- one or more sensors disposed on the one or more moving vehicles and in communication with an onboard computational subsystem of each of the one or more moving vehicles;
- a remotely-located back-office computational subsystem, wherein each of the onboard computational subsystems and the remotely-located back-office computational subsystem comprise:
  - one or more control modules, each of the one or more control modules having a processor, a non-transitory memory, and input/output (I/O) ports, the I/O ports of the control modules of the one or more moving vehicles in communication with the one or more sensors and with the remotely-located back-office computational subsystem control modules; the control modules executing program code portions stored in the non-transitory memory, the program code portions comprising:
  - a first algorithm portion having:
    - a first program code portion that collects sensor data from the one or more sensors disposed on the one or more moving vehicles, the sensor data including: position data from a global positioning system (GPS) sensor, thermal data from an infrared (IR) thermometer, and ambient air pressure, ambient air temperature, and humidity data from an air pressure sensor;
    - a second program code portion that estimates atmospheric parameters from the sensor data;
    - and a third program code portion that computes measurement coordinates from the first and second program code portions, the measurement coordinates including an estimated a cloud base height and an estimated cloud base temperature wherein the cloud base height is estimated from predicted lifting condensation levels, and wherein the cloud base temperature is estimated from sky emittance and ambient temperature, and wherein the third program portion calculates a cloud cover fraction according to:

$$A_c = \frac{(R - R_0)}{\sigma T_c^4 (1 - \epsilon_0)}$$

where $T_c$ is a predicted cloud base temperature, R is a measured sky emittance, $\epsilon_0$ is a predicted clear sky emissivity, $R_0$ is a predicted clear sky emittance calculated from the ambient temperature and clear sky emissivity, and $\sigma$ is the Stefan-Boltzmann constant;

and a second algorithm portion having:
  - a fourth program code portion that, from data received from the first, second, and third program code portions, and from high-definition map (HD Map) data, generates and selectively updates a cloud map, wherein the fourth program code portion determines a quality of global positioning system (GPS) sensor data and upon determining that the quality of the GPS sensor data is above or equal to a predetermined threshold value, the GPS sensor data used to update the cloud map, and upon determining that the quality of the GPS sensor data is below the predetermined threshold value, the GPS sensor data and data generated in the first, second, and third program code portions is discarded; and
  - the fourth program code portion further comprises a program code portion that determines that a portion of sky above the one or more moving vehicles is occluded, and upon determining that an occlusion level of the portion of sky above the one or more moving vehicles is above or equal to a predetermined threshold value, the GPS sensor data and data generated in the first, second, and third program code portions is used to update the cloud map, and upon determining that the occlusion level of the portion of sky above the one or more moving vehicles is below the predetermined threshold value, the GPS sensor data and data generated in the first, second, and third program code portions is discarded,
  wherein the fourth program code portion determines that the portion of sky above the one or more vehicles is occluded according to previously collected HD map information and from data comprising:
    GPS sensor data; ambient light conditions, forward illumination readings from cameras affixed to the one or more moving vehicles and used to qualify data collected by an infrared (IR) thermometer; an ambient air pressure sensor; an ambient humidity sensor; and an ambient air temperature sensor; and
    wherein GPS sensor data accuracy is high in locations without trees, tall buildings, mountains, tunnels and/or overpasses and decreases where line-of-sight communications with GPS satellites is interrupted or impaired by trees, tall buildings, mountains, tunnels, and/or overpasses; and
    wherein the one or more sensors of the one or more moving vehicles collect environmental and visibility condition information comprising: ambient light condition information, high light and low light condition information, and forward illumination readings;
  wherein the first algorithm portion is carried out in the onboard computational subsystems and the second algorithm portion is carried out in the remotely-located back-office computational subsystem.

18. The system for estimating cloud cover from one or more moving vehicles of claim 17, wherein the fourth program code portion selectively generates an updated cloud map in the remotely-located back-office computational subsystem and the remotely-located back-office computational subsystem continuously sends the updated cloud map to the one or more moving vehicles in the system, wherein the one or more moving vehicles receive the updated cloud map from the remotely-located back-office subsystem and selectively inform vehicle occupants of driving conditions based on the updated cloud map.

* * * * *